Patented Sept. 26, 1922.

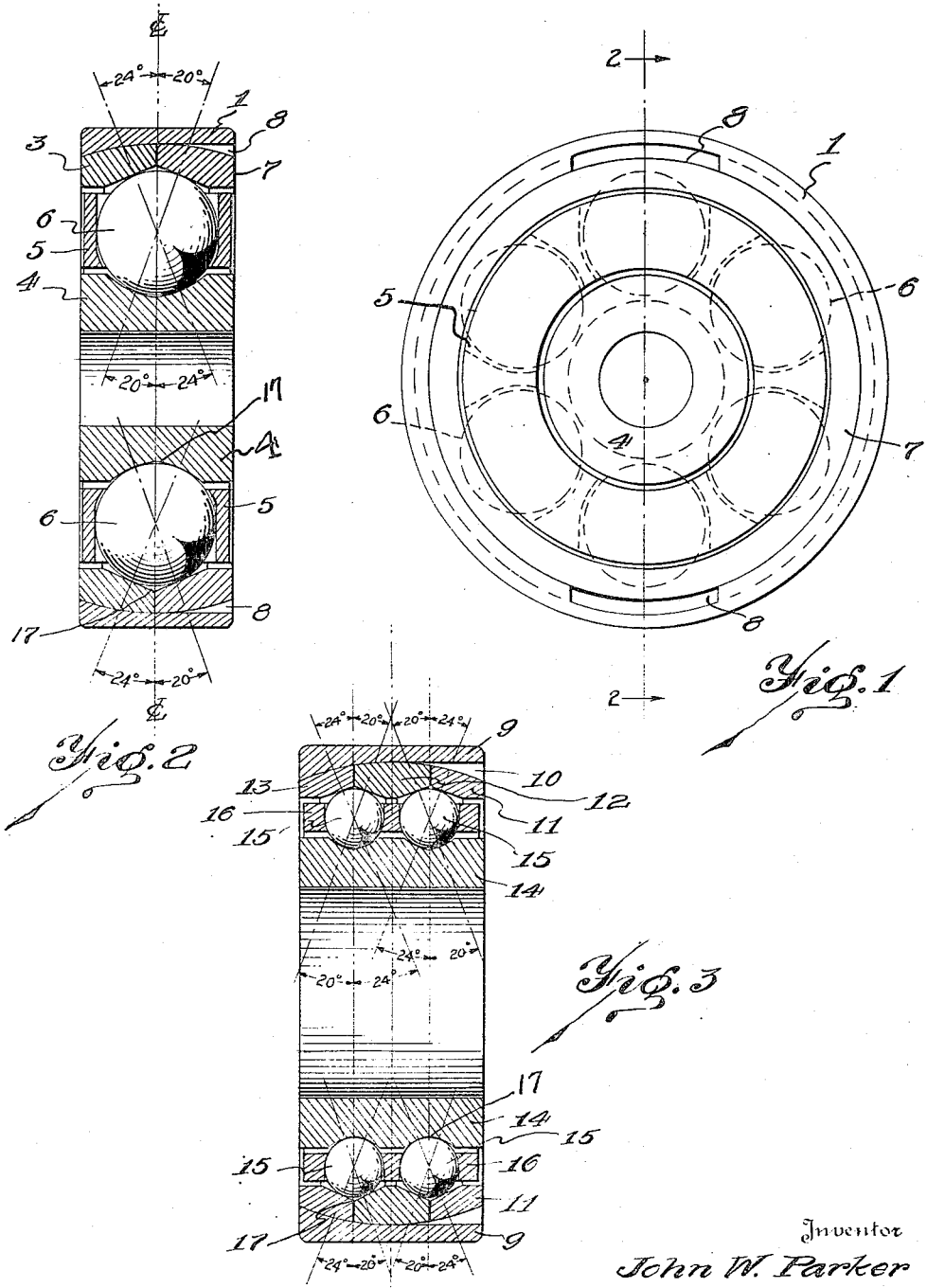

1,430,319

UNITED STATES PATENT OFFICE.

JOHN W. PARKER, OF DETROIT, MICHIGAN.

SELF-ALIGNING HIGH-SPEED BALL-RACE BEARING.

Application filed July 11, 1921. Serial No. 483,943.

*To all whom it may concern:*

Be it known that I, JOHN W. PARKER, a citizen of the Kingdom of Great Britain, residing at Detroit, county of Wayne, State of Michigan, have invented a new and useful Improvement in Self-Aligning High-Speed Ball-Race Bearings, of which the following is a specification, reference being had therein to the accompanying drawings.

My invention relates to a self aligning ball bearing, more particularly adapted for use in machines or the like having a relatively high speed shaft upon which the bearing is positioned to run.

One of the objects of my invention is to give a longer life to the balls and to the raceways than is given in the bearings of the prior art.

Another object of my invention is to provide such a bearing so constructed as to be quickly and easily assembled without the use of tools.

Another object of my invention is to provide such a bearing wherein the raceways are formed, one with a radius, and the other with an angle upon their bearing faces.

Another object of my invention is to provide such a bearing having a channel for allowing the passage of the lubricating oil in such a manner that the major portion of the oil is not subjected to the crushing effect caused by the pressure of the balls running over the same.

I am aware of the fact that there are other so called self aligning ball race bearings, but it has been my observation that in all of these bearings the raceways, after the bearing has been in use, show a slight track wear. In these bearings, if any change is made in the machine or shaft that would necessitate the re-aligning of the bearings, the balls would be running across the side of the track, causing vibration, as well as chipping of the balls and thus destroying the bearings. By the use of my invention, however, this is impossible, for the reason that irrespective of what change may take place in the machine or shaft, the balls must roll in their natural tracks, thus avoiding any friction or any unnatural wear.

These and other objects and advantages are shown in the arrangement, combination and construction of the various parts of my improved device as described in the specification, claimed in my claims and shown in the accompanying drawings, in which:

Fig. 1 is a side elevation of my improved bearing.

Fig. 2 is a sectional view taken on line 2—2 of Fig. 1.

Fig. 3 is a sectional view showing a double row ball race constructed in accordance with my invention.

In the construction of a single row bearing, I provide an outer shell or case 1, within which is the outer race ring, which is constructed of the two pieces 3 and 7. My reasons for constructing the outer race ring in two pieces is for simplicity of assembling and cheapness of manufacture. I also provide an inner race ring 4 and the balls 6, which are held in their respective positions by the retainer 5 between the inner and outer race rings.

The outer shell or casing 1 is provided with a radius similar to the outer radius on the combined race rings 3 and 7 so that the race rings may be moved within the shell at an angle thereto without becoming disassembled. It is obvious that although somewhat out of line with the said shell, the bearing will still operate and function naturally and without friction or vibration.

The outer shell or case 1 is provided with two oppositely disposed slots 8, which are graduated in depth from the outer edge of the shell to the center thereof as shown in Figs. 2 and 3. Thus, it will be seen, that the balls may be assembled in the retainers 5, the inner race ring 4, and the outer race rings 3 and 7, placed in their respective positions, and then the bearing as a whole inserted through the slots 8 into the shell or case 1 as far as the center thereof. In accomplishing this, the assembled bearing is at right angles to the shell, but after it has progressed into the shell as far as the center, it is then turned around in the shell so that the axes of the shell and race ring are concentric. The bearing is then in a position to operate.

The bearing faces of the race rings are so constructed that the points of contact of the balls on the raceways are at different angles to the center line of the ball on the respective sides of the raceways. For instance, as shown in Fig. 1, the point of contact of the ball on the right hand side of the outer raceway is 20 degrees off the center line of the ball, whereas the point of contact at the left hand side of the same raceway is 24 degrees off the center line of the ball.

Correspondingly, the right hand contact of the inner raceway is 24 degrees off the center line and the left hand point of contact is 20 degrees off the center line.

Thus, in the practical operation of my bearing, the rotation of the inner raceway will tend to cause the ball to rotate sidewise in varying degrees of speed, depending upon the angle of the point of contact to the center line of the ball, but the angle opposite thereof on the outer raceway will tend to equalize the rotative action imparted to the ball by the inner raceway and cause the ball to rotate sidewise in a manner similar to the way in which the planets rotate around the sun, so that the balls will rotate laterally or sidewise approximately once to every 365 revolutions of the balls around the axis of the shaft.

It will thus be seen that through this constant sidewise rotation the wear upon the balls is equalized so that it will not become "out of round", which latter action naturally will cause vibration and grinding away of the balls.

If, on the other hand, the angles of the points of contacts on the same raceways were equal, then the ball would simply roll in the one track and would develop in use a worn track thereon, causing friction, vibration and final giving away of the ball.

In order to utilize my invention in a double row bearing, as shown in Fig. 3, I provide an outer shell or casing 9, having oppositely disposed slots 10 similar to the slots 8 on the single row bearing. The inner side of the shell conforms in contour to the contour of the outer face of the combined outer race rings 11, 12 and 13. I also provide an inner ring 14 and balls 15. A ball retainer 16 is also employed and the same principles as hereinabove outlined for arranging the contact points of the balls in the raceways are followed. Likewise, the same principle of assembling the bearing is employed.

In the construction of my bearing it will be noted that a V shaped passage 17 is formed around the raceways by reason of the points of contacts of the balls being on the sides thereof. This permits the free passage of oil through the bearings and prevents that portion of the oil not in engagement with the balls from being crushed by the pressure of the balls thereon, thus increasing the life of the oil and reducing the friction and heat which naturally appears in ball races when run at high speeds.

I wish it understood that the respective angles herein illustrated as points of contact for the balls may be varied, it being only necessary that a different angle be used as points of contact on opposite sides of the center line of the balls.

It will thus be seen that my invention provides a highly efficient bearing, capable of a very long life and one which may be run at very high speed. Also, that my bearing is very quickly and easily assembled without the use of tools and that the bearing will operate and function smoothly and normally even though the shaft is out of line.

Some changes may be made in the arrangement and combination of the various parts of my improved device without departing from the spirit of the invention therein and it is my intention to cover by my claims such changes as may be reasonably included within the scope thereof.

What I claim is:

1. In a ball bearing, an inner race ring and an outer race ring, one of said race rings having a radiused groove therein and the other an angled groove therein, a plurality of balls between said race rings and adapted to run in said grooves, two points of contact for said balls on each groove, said points of contact on the groove in the outer raceway being at different angles to the center lines of the balls.

2. In a ball bearing, an inner race ring and an outer race ring, one of said race rings having a radiused groove therein and the other an angled groove therein, a plurality of balls between said race rings and adapted to run in said grooves, two points of contact for said balls on each groove, said points of contact on the groove in the inner race ring being at different angles to the center lines of the balls.

3. In a ball bearing, an inner race ring and an outer race ring, one of said race rings having a radiused groove therein and the other an angled groove therein, a plurality of balls between said race rings and adapted to run in said grooves, two points of contact for said balls on each of said grooves, said points of contact on the groove in the outer race ring being at different angles to the center lines of the ball, and said points of contact on the groove of the inner race ring being also at different angles to the center lines of the balls, the point of contact on the right hand side of the groove in the outer race ring being at the same angle to the center lines of the balls as the point of contact on the left hand side of the groove in the inner race ring, and the point of contact of the balls on the left hand side of the groove in the outer race ring being at the same angle to the center lines of the balls as the point of contact on the right hand side of the groove in the inner race ring.

4. In a ball bearing, an outer race ring and an inner race ring and balls adapted to run therebetween, said outer race ring being constructed of two rings whose peripheries cooperate in forming an approximate section of a sphere, and a casing adapted to enclose and hold said outer race ring in assembled position in such a manner that said outer race ring may be moved at any angle less than a right angle to said casing without becoming disengaged therefrom.

5. In a double row ball bearing, an outer race ring and an inner race ring adapted to engage with two rows of balls therebetween, said outer race ring being constructed of three rings whose combined peripheries form an approximate section of a sphere, and a casing adapted to enclose and hold said outer race ring in assembled position in such a manner that said outer race ring may be moved at any angle less than a right angle to said casing without becoming disengaged therefrom.

6. In a ball bearing, an inner race ring and an outer race ring, both having grooves therein, a plurality of balls between said race rings and adapted to run in said grooves, two points of contact for said balls on each groove, said points of contact on the inner race ring groove being at different angles to the center lines of the said balls, said points of contact on the outer race ring groove being at the same angles to the center lines of the balls as those on the inner race ring groove, the opposing points of contact of the inner and outer race ring grooves being also at different angles to the center lines of said balls.

JOHN W. PARKER.